US012730020B2

(12) United States Patent
Nagura

(10) Patent No.: US 12,730,020 B2
(45) Date of Patent: Sep. 8, 2026

(54) TACTILE SENSOR AND APPARATUS INCLUDING TACTILE SENSOR

(71) Applicant: CANON KABUSHIKI KAISHA, Tokyo (JP)

(72) Inventor: Chihiro Nagura, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 315 days.

(21) Appl. No.: 18/341,208

(22) Filed: Jun. 26, 2023

(65) Prior Publication Data

US 2024/0003764 A1 Jan. 4, 2024

(30) Foreign Application Priority Data

Jun. 29, 2022 (JP) ................................ 2022-104762

(51) Int. Cl.
*G01L 1/24* (2006.01)
*G01L 5/00* (2006.01)

(52) U.S. Cl.
CPC ............ *G01L 1/242* (2013.01); *G01L 5/0061* (2013.01)

(58) Field of Classification Search
CPC ......... G01L 1/24; G01L 1/242; G01L 5/0061; G01L 5/166; B25J 13/084; B25J 19/021
See application file for complete search history.

(56) References Cited

U.S. PATENT DOCUMENTS 6,909,084 B2 * 6/2005 Tachi ...................... G01L 1/247 250/221
7,420,155 B2 * 9/2008 Mizota .................... G01L 5/228 250/221
7,460,964 B2 * 12/2008 Mizota .................... G01L 5/228 702/41
10,359,329 B2 * 7/2019 Buyuksahin ........... B25J 13/084
11,946,780 B2 * 4/2024 Nagura .................... G01D 5/38
12,135,254 B2 * 11/2024 Adelson ................ G01L 5/0061
12,332,046 B2 * 6/2025 Rohaly ................... G01L 5/226
(Continued)

FOREIGN PATENT DOCUMENTS

CN 1349781 A * 5/2002
JP 2007147443 A * 6/2007
JP 2009276127 A 11/2009
(Continued)

*Primary Examiner* — Octavia Hollington
(74) *Attorney, Agent, or Firm* — Canon U.S.A., Inc., IP Division

(57) ABSTRACT

A tactile sensor includes a light guide unit extending in a predetermined direction, provided to guide light, incident from a light-emitting element, in the predetermined direction and including a pair of surfaces opposite to each other extending in the predetermined direction, an optical translucent elastic member, disposed on one side of the light guide unit, including a marker configured to diffuse light incident via one surface of the light guide unit toward the light guide unit, a light-receiving unit provided on the other side of the light guide unit and including a plurality of light-receiving elements on a light-receiving surface, and a plurality of opening portions provided between the light guide unit and the light-receiving unit and optically opened such that the light from the marker is projected to different positions, spaced apart from one another, on the light-receiving surface of the light-receiving unit.

7 Claims, 13 Drawing Sheets

(56) References Cited

U.S. PATENT DOCUMENTS

| | | | | |
|---|---|---|---|---|
| 2018/0180496 | A1* | 6/2018 | Uemura | G01L 1/2293 |
| 2020/0393313 | A1* | 12/2020 | Yu | G01L 1/241 |

FOREIGN PATENT DOCUMENTS

| | | | | | |
|---|---|---|---|---|---|
| JP | 2011060101 | A | * | 3/2011 | |
| JP | 2014021576 | A | * | 2/2014 | |
| JP | 2019197037 | A | * | 11/2019 | G01L 1/24 |
| JP | 6864401 | B1 | * | 4/2021 | G01L 5/166 |
| JP | 2022033634 | A | | 3/2022 | |
| WO | WO-0218893 | A1 | * | 3/2002 | G01L 1/247 |
| WO | WO-2005029028 | A1 | * | 3/2005 | G01L 5/166 |

* cited by examiner

FIG.2

TACTILE SENSOR AND APPARATUS INCLUDING TACTILE SENSOR

BACKGROUND

Field of the Disclosure

The present disclosure relates to a tactile sensor and an apparatus including the tactile sensor.

Description of the Related Art

Tactile sensors that detect a pressure, a shearing force, and the like are used, for example, when an object such as a soft object or an object having an unknown shape is held. For example, an optical tactile sensor such as one in a technique discussed in Japanese Patent Application Laid-Open No. 2019-197037 is used by being mounted on a robot hand. More specifically, Japanese Patent Application Laid-Open No. 2019-197037 discloses an optical tactile sensor that determines the magnitude of an external force based on a change in the state of a light quantity due to a displacement of a light-translucent unit when the external force is applied to a contact deformable unit to which light from a light source is supplied.

However, the tactile sensor disclosed in Japanese Patent Application Laid-Open No. 2019-197037 may have such an issue that the external force cannot be correctly detected due to a change in a light emission quantity of the light incident from a light emission unit such as the light source or a change in waveguiding efficiency of the light (a change in an illumination characteristic) due to a deformation of a route along the way from the light emission unit to a light-receiving unit.

SUMMARY

Aspects of the present disclosure provide a highly accurate tactile sensor insusceptible to a change in a light emission quantity of light incident from a light emission unit or a change in an illumination characteristic of the light.

According to an aspect of the present disclosure, a tactile sensor includes a light emission unit configured to emit light, a light guide unit, extending in a predetermined direction, provided to guide light, incident from the light emission unit via an optical end optically coupled with the light emission unit, in the predetermined direction, the light guide unit including a pair of surfaces, opposite to each other, extending in the predetermined direction, an optical translucent elastic member optically coupled with the light guide unit via one surface of the pair of surfaces and including a marker configured to diffuse light, incident via the one surface, toward the light guide unit, a light-receiving unit provided on a side of the light guide unit closer to the other surface of the pair of surfaces than to the one surface, and including a plurality of light-receiving elements on a light-receiving surface, and a plurality of opening portions provided between the other surface and the light-receiving unit, and optically opened such that light from the marker is projected to different positions, spaced apart from one another, on the light-receiving surface of the light-receiving unit.

The present disclosure also includes an apparatus including a tactile sensor.

Further features of the present disclosure will become apparent from the following description of embodiments with reference to the attached drawings.

BRIEF DESCRIPTION OF THE DRAWINGS

FIG. 2 illustrates the optical tactile sensor according to the first embodiment of the present disclosure in a state where an outer skin illustrated in FIG. 1 is removed therefrom as viewed from above.

DESCRIPTION OF THE EMBODIMENTS

In the following description, embodiments for carrying out the present disclosure will be described with reference to the drawings.

First, a first embodiment will be described.

Figure 1:
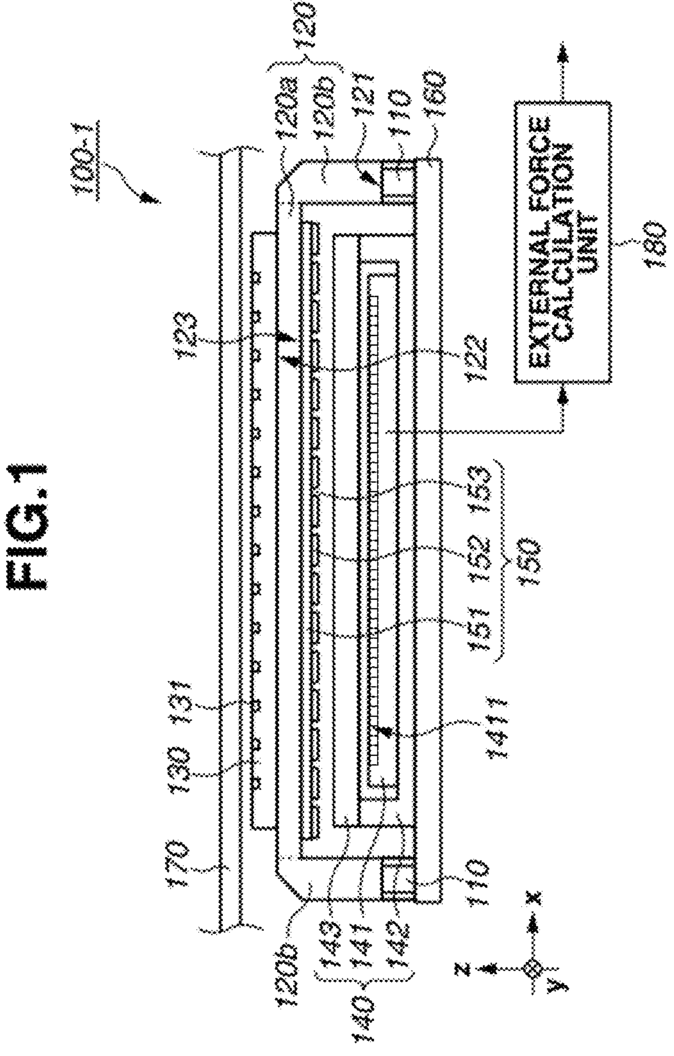
FIG. 1 illustrates an example of an outline of the configuration of an optical tactile sensor according to a first embodiment of the present disclosure.

FIG. 1 illustrates an example of an outline of the configuration of an optical tactile sensor 100-1 according to the first embodiment of the present disclosure. As illustrated in FIG. 1, the optical tactile sensor 100-1 includes light-emitting elements 110, a light guide unit 120, a light-translucent elastic member 130, a light-receiving sensor unit 140, a light-shielding film 150, a circuit board 160, an outer skin 170, and an external force calculation unit 180. The light guide unit 120 includes an intra-layer/inter-layer light guide unit 120*a* and a support light guide unit 120*b*. Further, FIG. 1 illustrates an xyz coordinate system for clearly indicating the layout relationship of constituent units of the optical tactile sensor 100-1. The intra-layer/inter-layer light guide unit 120*a* includes a couple of functions that include a former one in association with an intra-layer light guiding function and a latter one in association with an inter-layer light guiding function. The former one in association with the intra-layer light guiding function includes an outer intra-layer light guiding function between the light guide unit 120 and the light-translucent elastic member 130 via one surface 122 and an inner intra-layer light guiding function between the light guide unit 120 and a translucent substrate 151 via another surface 123. On the other hand, the latter one in association with the inter-layer light guiding function includes a light propagation function along the light guide unit 120 with the multipath reflection occurred at the one surface 122 and the other surface 123 alternately. When referring to FIG. 1, the x-axis extends from left to right, and the z-axis extends from top to bottom.

Each of the light-emitting elements 110 is a light-emitting element corresponding to a light emission unit that emits light. In the present embodiment, the light-emitting element 110 includes a light source such as a light-emitting diode (LED) that irradiates inside of the intra-layer/inter-layer light guide unit 120*a* with light via the support light guide unit 120*b*.

The light guide unit 120 includes the intra-layer/inter-layer light guide unit 120*a* provided to extend in a predetermined direction to guide light incident from the light-emitting element 110 via an optical end 121 optically coupled with the light-emitting element 110 in the predetermined direction, and the support light guide unit 120*b* supporting the intra-layer/inter-layer light guide unit 120*a* to space it apart from a cover glass 143.

The intra-layer/inter-layer light guide unit 120*a* is a portion of the light guide unit 120 that is configured to guide the light introduced via the optical end 121 to an array region overlapping the light-receiving sensor unit 140 in the layer, and guide the light between layers of markers 131 and the light-receiving unit 141 in the array region. A light-translucent optical member having a plate-like shape with a predetermined thickness is employed as the intra-layer/inter-layer light guide unit 120*a*. Further, the intra-layer/inter-layer light guide unit 120*a* is also stated as a light-translucent optical member for guiding the light incident via the optical end 121 in the predetermined direction. On the other hand, the support light guide unit 120*b* supports the intra-layer/inter-layer light guide unit 120*a* so as to space it apart from the light-receiving unit 141, the light-translucent elastic member 130, the markers 131, and the light-emitting elements 110 with a predetermined distance secured therebetween. The support light guide unit 120*b* according to the present embodiment includes the optical end 121 optically coupled with each of the light-emitting elements 110 to introduce light from the light-emitting element 110, and also has a light-guiding property for guiding the introduced light to the intra-layer/inter-layer light guide unit 120*a*. The support light guide unit 120*b* is also stated as a spacer member that supports the intra-layer/inter-layer light guide unit 120*a* while maintaining a predetermined interval between the intra-layer/inter-layer light guide unit 120*a* and the cover glass 143 without being elastically deformed integrally with the light-translucent elastic member 130. Desirably, the support light guide unit 120*b* is a substantially nondeformable rigid member similar to the intra-layer/inter-layer light guide unit 120*a* from a viewpoint of linearity between a deformation and a displacement of a light ray. However, similarly to the intra-layer/inter-layer light guide unit 120*a*, a configuration in which the support light guide unit 120*b* deforms in line with a deformation of the light-translucent elastic member 130 is also included as a modification of the present embodiment.

The predetermined direction includes an x direction in an xz plane illustrated in FIG. 1. The intra-layer/inter-layer light guide unit 120*a* includes the pair of surfaces 122 and 123 opposite from each other in the predetermined direction. Desirably, the intra-layer/inter-layer light guide unit 120*a* is made from a material transparent with regard to the wavelength of the light incident from the light-emitting elements 110 and sufficiently rigid against the light-translucent elastic member 130, such as acrylic, polycarbonate (PC), or glass.

The light guide unit 120 equipped with the intra-layer/inter-layer light guide unit 120*a* but unequipped with the support light guide unit 120*b* is also included in the present embodiment. This means such a configuration in which the light-emitting element 110 or an optical fiber end that guides the light from the light-emitting element 110 and emits the light is provided on a support unit (not illustrated) provided on an opposite side of the circuit board 160 instead of the support light guide unit 120*b*. In this case, the support unit (not illustrated) is similar to the support light guide unit 120*b* in that the support unit (not illustrated) supports the intra-layer/inter-layer light guide unit 120*a*, but is different from the support light guide unit 120*b* in that the support unit (not illustrated) does not include the optical end 121. In this case, the intra-layer/inter-layer light guide unit 120*a* includes the optical end 121.

The light-translucent elastic member 130 is an optical translucent elastic member optically coupled with the intra-layer/inter-layer light guide unit 120*a* via the surface 122, which is one of the pair of surfaces 122 and 123 of the intra-layer/inter-layer light guide unit 120*a*. The light-translucent elastic member 130 further includes the markers 131 that diffuse light, which is incident on the markers via the one surface 122, toward the one surface 122, and includes a light-translucent elastic body. The light-translucent elastic member 130 is formed by gluing of the light-translucent elastic body made of plate-like silicone gel or the like to the one surface 122 of the intra-layer/inter-layer light guide unit 120*a*. The light-translucent elastic member 130 can be made from various kinds of light-translucent elastomer or resin including a silicone-based material or a urethane-based material. In the example illustrated in FIG. 1, the markers 131 are formed to be embedded in a surface (an upper surface) opposite of the surface of the light-translucent elastic member 130 glued to the intra-layer/inter-layer light guide unit 120*a*. In the present embodiment, the markers 131 are diffusible and have a property of diffusing light at a wide angle when receiving illumination light. The markers 131 can be made from a diffusible material such as various kinds of resin, ceramic, or ink, but may be made from a fluorescent material, an LED, or the like. In the case of a fluorescent material or an LED, light from the markers 131 can be distinguished based on the wavelength, and therefore a signal-to-noise (SN) ratio can be improved by insertion of a wavelength filter, which will be described below, in an optical path to a light-receiving surface 1411 of the light-receiving unit 141. The light-translucent elastic member 130 has optical translucency as an optical characteristic capable of propagating light from the markers 131 to the light-receiving unit 141 via opening portions 153. As the light-translucent elastic member 130, a transparent member less diffusible with regard to the wavelength of the transmitted light can be used from a viewpoint of linearity of the optical path before and after the markers 131. The optical translucency is also stated as an optical transmittance.

The light-receiving sensor unit 140 includes the light-receiving unit 141, a package 142, and the cover glass 143. The light-receiving unit 141 is a light-receiving unit provided on a side closer to the other surface 123 of the pair of surfaces 122 and 123 of the intra-layer/inter-layer light guide unit 120*a*, than to the one surface 122, and two-dimensionally including a plurality of light-receiving elements on the light-receiving surface 1411. The light-receiving unit 141 outputs first information, which is a two-dimensional image signal regarding a distribution of light received on the light-receiving surface 1411, to the external force calculation unit 180. More specifically, in the present embodiment, the light-receiving unit 141 converts a light quantity distribution of the light received on the light-receiving surface 1411 into the two-dimensional image signal (the first information). The light-receiving sensor unit 140 is formed of the light-receiving unit 141 mounted inside the package 142, and the package 142 sealed with the cover glass 143. In this case, the intra-layer/inter-layer light guide unit 120*a* is held to face the cover glass 143 with a space therebetween. In the case where a fluorescent material is used for the markers 131, the optical tactile sensor 100-1 employs a configuration including a film non-transmissive with regard to the light emission wavelength of the light emitted from the light-emitting elements 110 but transmissive with regard to the fluorescence wavelength on a surface of the cover glass 143 as the wavelength filter. In the configuration, the optical tactile sensor 100-1 allows a fluorescent component from the markers 131 to be selected based on the wavelength and guided to the light-receiving surface 1411, and therefore can improve the SN ratio of a detection signal on the light-receiving unit 141.

The light-shielding film 150 is glued to the other surface 123 of the intra-layer/inter-layer light guide unit 120*a* that faces the cover glass 143. The light-shielding film 150 is formed to include a light-shielding layer 152 on a surface (the lower surface) of the translucent substrate 151 glued to the other surface 123 of the intra-layer/inter-layer light guide unit 120*a*. In the present embodiment, in the light-shielding film 150, for example, an aluminum film as the light-shielding layer 152 is formed on the surface (the lower surface) of the translucent substrate 151, and the aluminum film is partially removed by etching, and the removed portion works as a plurality of arrayed opening portions 153. In this case, the aluminum film as the light-shielding layer 152 has a function as a reflection film that confines light inside the intra-layer/inter-layer light guide unit 120*a* at the same time. The plurality of opening portions 153 is opening portions provided between the other surface 123 of the intra-layer/inter-layer light guide unit 120*a* and the light-receiving unit 141, and optically opened in such a manner that the light from the markers 131 is projected to be spaced apart from one another at different positions on the light-receiving surface 1411 of the light-receiving unit 141. In the present embodiment, the plurality of opening portions 153 has transmittance higher than that of a region between the plurality of opening portions 153 (a region on which the light-shielding layer 152 is formed).

Various kinds of electric components are mounted on the circuit board 160. The light-receiving sensor unit 140 and the light-emitting elements 110 are mounted on the circuit board 160.

The outer skin 170 is provided above the light-translucent elastic member 130, and is deformable in reaction to contact with an object. A force received by the outer skin 170 due to contact with an object is transmitted to the light-translucent elastic member 130 via the outer skin 170. Desirably, a property of absorbing the wavelength of the light from the light-emitting elements 110 is provided to a surface of the outer skin 170 that contacts the light-translucent elastic member 130 to prevent a contact portion from causing diffusion. A reason therefor is that, if diffusion occurs on the outer skin 170, the diffusion occurred on the outer skin 170 might be superimposed on a diffusion image derived from the markers 131 and reduces the SN ratio. Desirably, the portion of the outer skin 170 that contacts the light-translucent elastic member 130 is structured to reduce a contact area not to interfere with the waveguiding of light inside the intra-layer/inter-layer light guide unit 120*a* and the light-translucent elastic member 130. For example, the outer skin 170 may be configured in such a manner that microstructural unevenness or a plurality of protrusions is formed on a portion thereof that contacts the light-translucent elastic member 130. The outer skin 170 can be made of a material such as a cloth, a resin film, or a rubber.

The external force calculation unit 180 is a calculation unit that calculates second information regarding an external force received by the light-translucent elastic member 130 based on the two-dimensional image signal (the first information) output from the light-receiving unit 141 regarding the distribution of the light received on the light-receiving surface 1411. More specifically, in the present embodiment, the external force calculation unit 180 calculates a force vector distribution as the second information regarding the external force received by the light-translucent elastic member 130.

Figure 2:
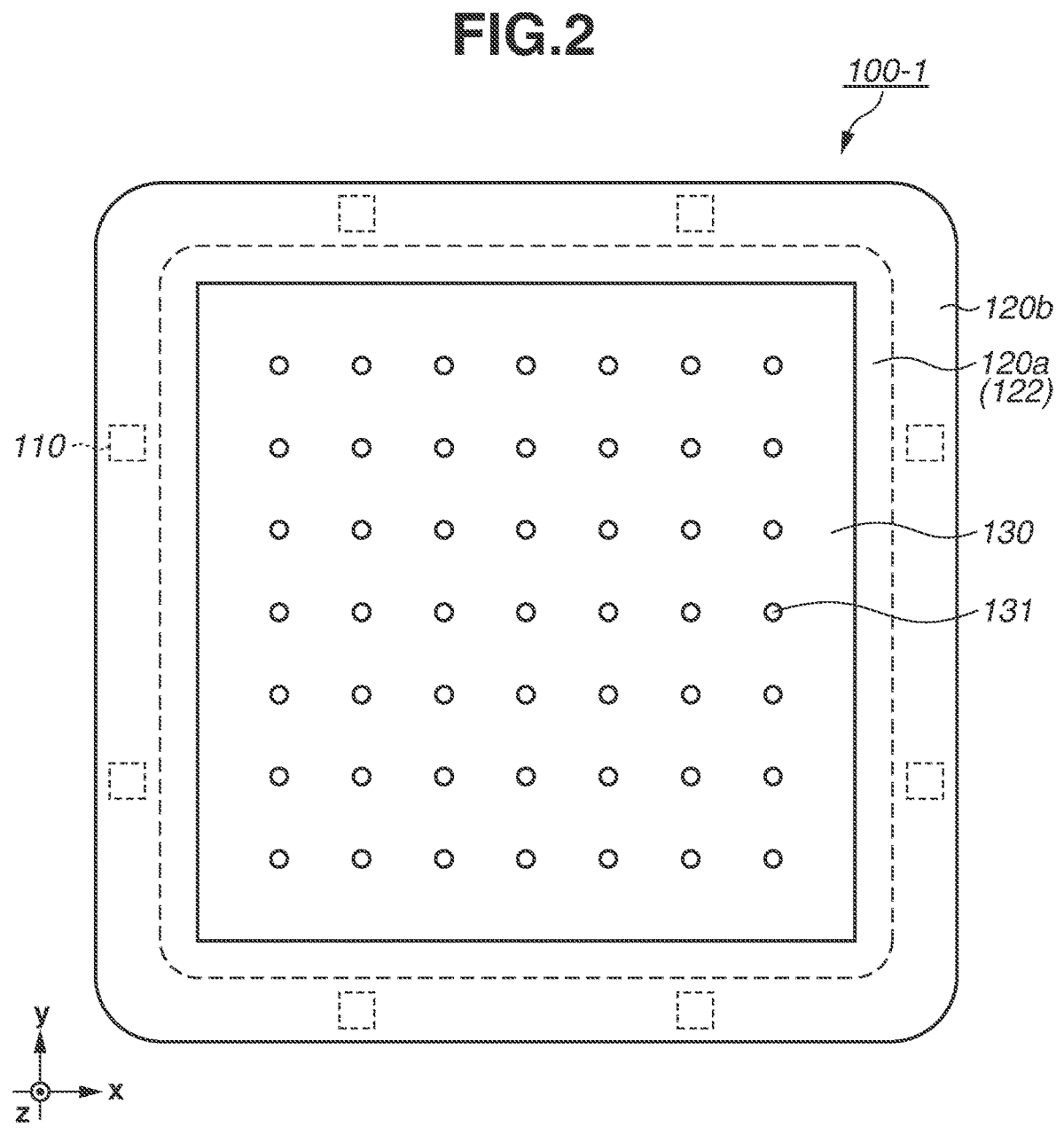

FIG. 2 illustrates the optical tactile sensor 100-1 according to the first embodiment of the present disclosure in a state where the outer skin 170 illustrated in FIG. 1 is removed therefrom as viewed from above (a +z direction). Components similar to the components illustrated in FIG. 1 are identified by the same reference numerals in FIG. 2, and the detailed descriptions thereof will be omitted. Further, FIG. 2 illustrates an xyz coordinate system corresponding to the xyz coordinate system illustrated in FIG. 1.

The light-emitting elements 110 are disposed two each on each side of the support light guide unit 120*b* disposed on the periphery of the optical tactile sensor 100-1 at intervals. The provision of the plurality of light-emitting elements 110 leads to an even light quantity distribution inside the intra-layer/inter-layer light guide unit 120*a* and a reduction in a variation in detection sensitivity for each location, thereby contributing to further ensuring detection accuracy. A light flux incident from the light-emitting elements 110 into the light guide unit 120 is guided while repeating multipath reflection on the one surface 122 and the other surface 123 of the light guide unit 120. A light flux incident on the light-translucent elastic member 130 is reflected on the upper surface of the light-translucent elastic member 130, which is in contact with air, and is again incident on the intra-layer/inter-layer light guide unit 120*a*. Further, a light flux incident from the intra-layer/inter-layer light guide unit 120*a* on the light-shielding film 150 is reflected on the reflective light-shielding layer 152, and is again incident on the intra-layer/inter-layer light guide unit 120*a*. While the multipath reflection is repeated in this manner, the inside of the light-translucent elastic member 130 is illuminated.

The markers 131 in the light-translucent elastic member 130 radiate diffused light at a wide light distribution angle due to diffusion in reaction to the illumination. A part of the diffused light from one marker 131 passes through two opening portions among the plurality of opening portions 153 on the light-shielding film 150, and is incident on and transmitted through an interface with air at an incident angle smaller than that of the guided light flux. Then, the light flux transmitted through the interface with the air is transmitted through the cover glass 143, and form two spots (spots 400 illustrated in FIG. 4, which will be described below), which are regions having a locally great light quantity, on the light-receiving surface 1411 of the light-receiving unit 141.

A light flux in the diffused light from the marker 131 that is reflected on the light-shielding layer 152 of the light-shielding film 150 is transmitted through the upper surface of the light-translucent elastic member 130 and is absorbed by the outer skin 170. Further, when the outer skin 170 contacts an object and the light-translucent elastic member 130 receives an external force via the outer skin 170, the light-translucent elastic member 130 is deformed. The markers 131 provided in the light-translucent elastic member 130 are moved along with the deformation of the light-translucent elastic member 130.

Figure 3:
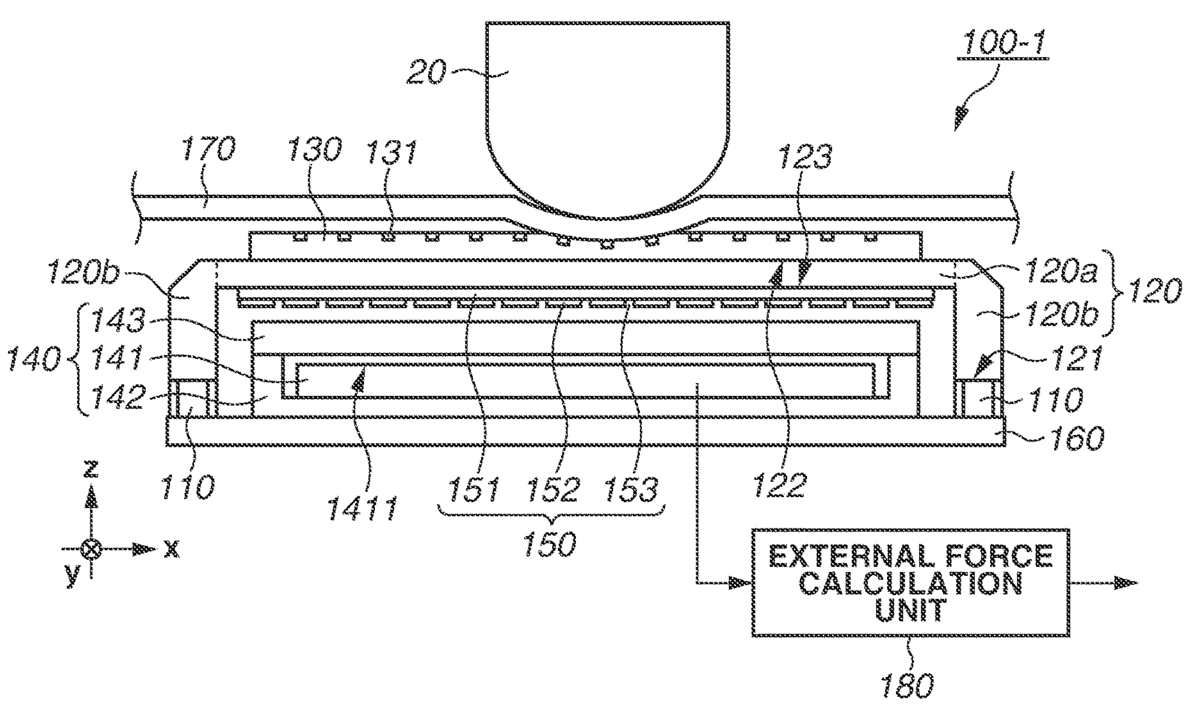
FIG. 3 illustrates an example of the optical tactile sensor according to the first embodiment of the present disclosure in a state where the outer skin contacts an object and receives an external force.

FIG. 3 illustrates an example of the optical tactile sensor 100-1 according to the first embodiment of the present disclosure in a state where the outer skin 170 contacts an object 20 and receives an external force. Components similar to the components illustrated in FIGS. 1 and 2 are identified by the same reference numerals in FIG. 3, and the detailed descriptions thereof will be omitted. Further, FIG. 3 illustrates an xyz coordinate system corresponding to the xyz coordinate system illustrated in FIG. 1.

As illustrated in FIG. 3, when the outer skin 170 contacts the object 20 and the light-translucent elastic member 130 receives the external force via the outer skin 170, the light-translucent elastic member 130 is deformed, and the markers 131 provided in the light-translucent elastic member 130 are displaced. At this time, the markers 131 are displaced (moved) in substantially the same direction as the direction of the external force.

Next, a method for detecting a movement amount of the marker 131 due to the external force and calculating the external force by the external force calculation unit 180 will be described.

Figure 4:
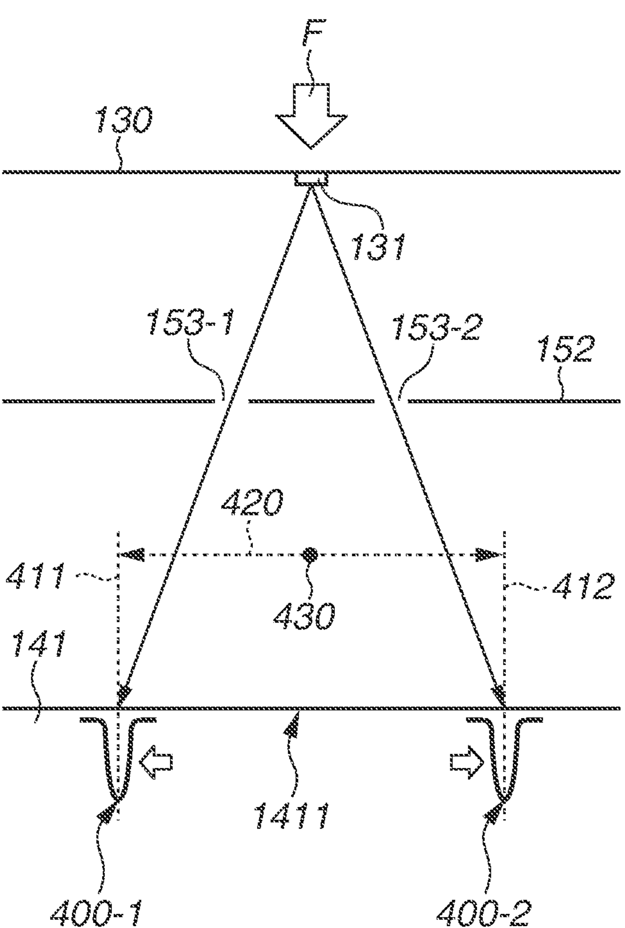
FIG. 4 illustrates how spots projected on a light-receiving surface of a light-receiving unit are moved along with a movement of a marker when a light-translucent elastic member receives a perpendicular external force in the optical tactile sensor according to the first embodiment of the present disclosure.

FIG. 4 illustrates how the spots 400 projected on the light-receiving surface 1411 of the light-receiving unit 141 are moved along with the movement of the marker 131 when the light-translucent elastic member 130 receives a perpendicular external force F in the optical tactile sensor 100-1 according to the first embodiment of the present disclosure. Components similar to the components illustrated in FIGS. 1 to 3 are identified by the same reference numerals in FIG. 4, and the detailed descriptions thereof will be omitted.

In FIG. 4, a spot 400-1 is a first spot where the light quantity is locally great on the light-receiving surface 1411 of the light-receiving unit 141 due to light from the marker 131 that is transmitted through a first opening portion 153-1 of the two adjacent opening portions 153. Further, a spot 400-2 is a second spot where the light quantity is locally great on the light-receiving surface 1411 of the light-receiving unit 141 due to light from the marker 131 that is transmitted through a second opening portion 153-2 of the two adjacent opening portions 153. FIG. 4 illustrates the distance between a central position 411 of the first spot 400-1 and a central position 412 of the second spot 400-2 as a distance 420. Further, FIG. 4 illustrates the central position between the central position 411 of the first spot 400-1 and the central position 412 of the second spot 400-2 as a central position 430.

In FIG. 4, the distance 420 between the two spots 400 formed by the one marker 131 changes depending on the ratio of the distance between the marker 131 and the opening portions 153 to the distance from the opening portions 153 to the light-receiving surface 1411 of the light-receiving unit 141. As illustrated in FIG. 4, when the external force F is received perpendicularly to the upper surface of the light-translucent elastic member 130, the marker 131 is moved downward, and the distance between the marker 131 and the opening portions 153 reduces. As a result, the distance 420 between the two spots 400 increases. Accordingly, the external force calculation unit 180 can calculate the perpendicular external force F by calculating, for example, the distance 420 based on the first information, which is the two-dimensional image signal acquired by the light-receiving unit 141.

Figure 5:
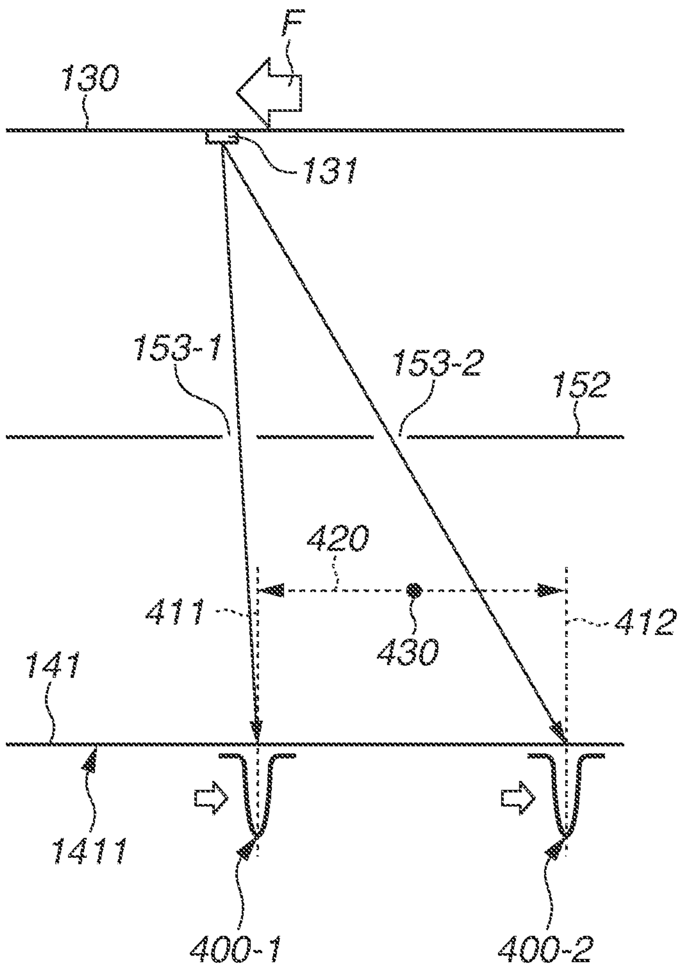
FIG. 5 illustrates how the spots projected on the light-receiving surface of the light-receiving unit are moved along with a movement of the marker when the light-translucent elastic member receives an external force applied in a shearing direction in the optical tactile sensor according to the first embodiment of the present disclosure.

FIG. 5 illustrates how the spots 400 projected on the light-receiving surface 1411 of the light-receiving unit 141 are moved along with the movement of the marker 131 when the light-translucent elastic member 130 receives an external force F applied in a shearing direction in the optical tactile sensor 100-1 according to the first embodiment of the present disclosure. Components similar to the components illustrated in FIGS. 1 to 4 are identified by the same reference numerals in FIG. 5, and the detailed descriptions thereof will be omitted.

In FIG. 5, when the light-translucent elastic member 130 receives the external force F in the shearing direction via the outer skin 170, the marker 131 is moved in an in-plane direction of the light-translucent elastic member 130 as illustrated in FIG. 5. As a result, the central position 430 is moved in an opposite direction of the external force F in the shearing direction. Accordingly, the external force calculation unit 180 can calculate the external force F in the shearing direction by calculating, for example, an average value of values of the central position 430 based on the first information, which is the two-dimensional image signal acquired by the light-receiving unit 141.

The ratio of the movement amount of the two spots 400 (the pair of spots) to the movement amount of the marker 131 can be secured as a distance from the opening portions 153 to the light-receiving surface 1411 of the light-receiving unit 141 is set to be longer than a predetermined distance in relation to the distance between the marker 131 and the opening portions 153. This can improve the sensitivity of the optical tactile sensor 100-1 but easily cause an overlap with a spot 400 formed by an adjacent marker 131. Thus, it is desirable to select an appropriate design value in consideration of balance between required sensitivity and spatial resolution. The predetermined distance from the opening portions 153 to the light-receiving surface 1411 of the light-receiving unit 141 is appropriately determined based on a relationship between a size reduction and the detection sensitivity of the tactile sensor.

Next, a layout of the plurality of markers 131 and the plurality of opening portions 153 will be described.

Figure 6:
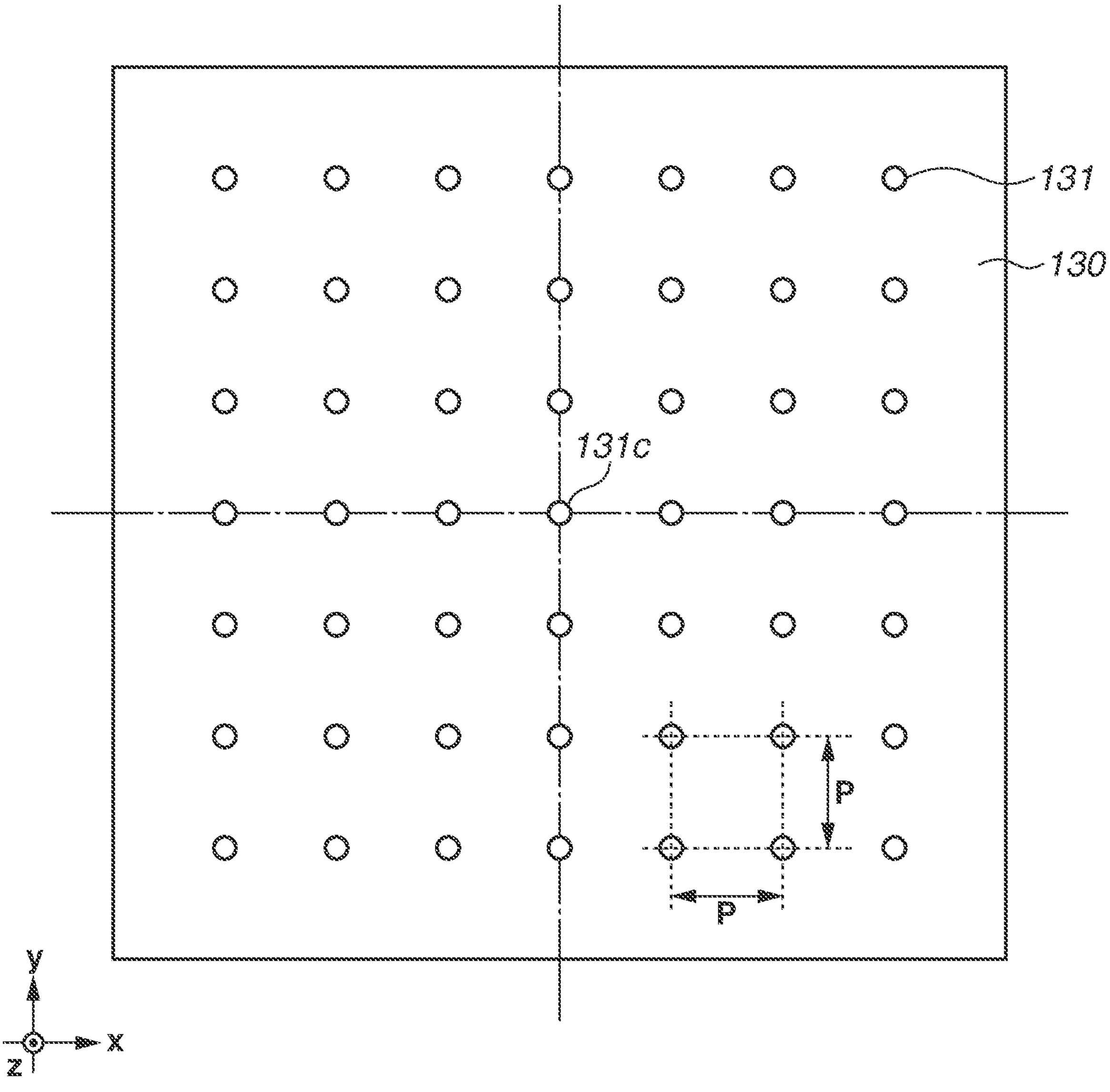
FIG. 6 illustrates the light-translucent elastic member of the optical tactile sensor according to the first embodiment of the present disclosure as viewed from above.

FIG. 6 illustrates the light-translucent elastic member 130 of the optical tactile sensor 100-1 according to the first embodiment of the present disclosure as viewed from above (the +z direction). Components similar to the components illustrated in FIGS. 1 to 5 are identified by the same reference numerals in FIG. 6, and the detailed descriptions thereof will be omitted. Further, FIG. 6 illustrates an xyz coordinate system corresponding to the xyz coordinate system illustrated in FIG. 1.

As illustrated in FIG. 6, the markers 131 provided on the light-translucent elastic member 130 are laid out in a two-dimensional grid-like pattern vertically and horizontally (the y direction and x direction) at pitches P. Further, FIG. 6 illustrates one of the markers 131 located at the center in the xy plane of the light-translucent elastic member 130 as a marker 131*c*.

Figure 7:
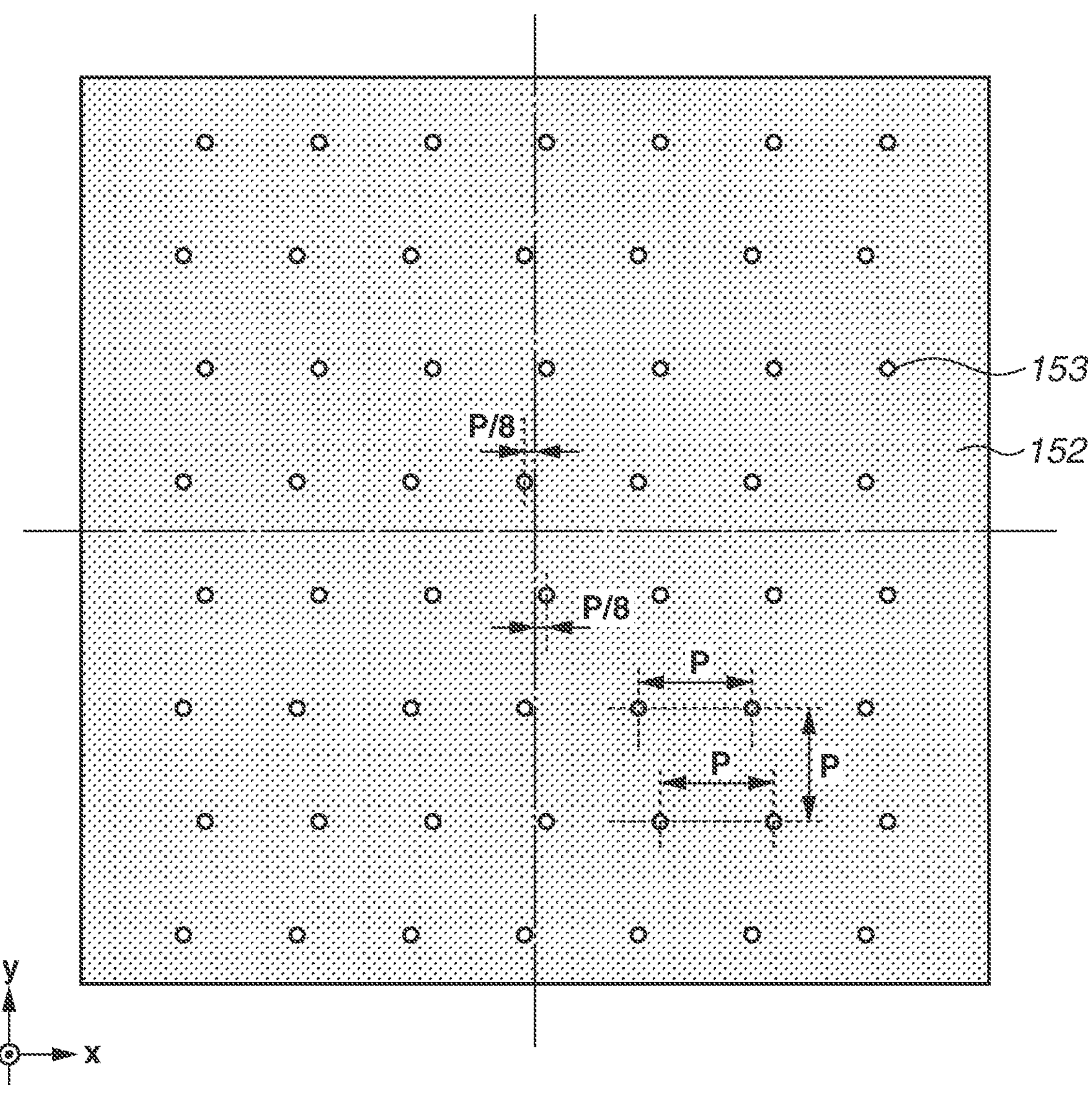
FIG. 7 illustrates a light-shielding layer of the optical tactile sensor according to the first embodiment of the present disclosure as viewed from above.

FIG. 7 illustrates the light-shielding layer 152 of the optical tactile sensor 100-1 according to the first embodiment of the present disclosure as viewed from above (the +z direction). Components similar to the components illustrated in FIGS. 1 and 3 to 5 are identified by the same reference numerals in FIG. 7, and the detailed descriptions thereof will be omitted. Further, FIG. 7 illustrates an xyz coordinate system corresponding to the xyz coordinate system illustrated in FIG. 1.

As illustrated in FIG. 7, the plurality of opening portions 153 provided to the light-shielding layer 152 are arranged to be shifted leftward or rightward by ±P/8 for each row.

Now, desirable settings of the layout of the markers 131 and the opening portions 153 and a refractive index inside the optical tactile sensor 100-1 will be described.

Figure 8:
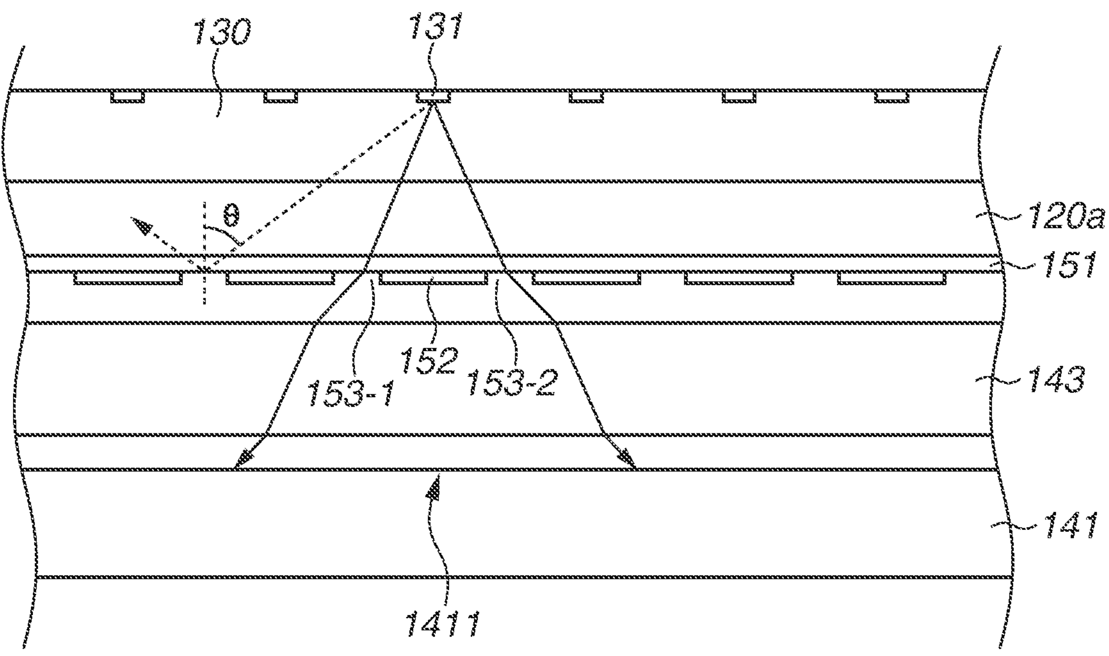
FIG. 8 illustrates an example of an optical path of diffused light from the marker in the optical tactile sensor according to the first embodiment of the present disclosure.

FIG. 8 illustrates an example of an optical path of the diffused light from the marker 131 in the optical tactile sensor 100-1 according to the first embodiment of the present disclosure. Components similar to the components illustrated in FIGS. 1 to 7 are identified by the same reference numerals in FIG. 8, and the detailed descriptions thereof will be omitted.

Supposing that a light flux exits a medium having a refractive index n1 and enters a medium having a refractive index n2, the light flux is totally reflected and cannot pass through an interface if an incident angle θ on the interface exceeds a critical angle θc expressed by the following formula (1).

$$\theta c = \sin^{-1}\frac{n2}{n1} \tag{1}$$

The two opening portions 153-1 and 153-2, via which a pair of spots is projected from one marker 131 to the light-receiving surface 1411 of the light-receiving unit 141, are laid out so that the diffused light from the one marker 131 is incident on each of the two opening portions 153-1 and 153-2 at an angle smaller than the critical angle θc. Further, opening portions 153 other than the above-described two opening portions 153-1 and 153-2 are laid out so that the diffused light from the one marker 131 is incident on each of the opening portions 153 at an angle larger than the critical angle θc.

In FIG. 8, light fluxes (solid lines) transmitted through the two opening portions 153-1 and 153-2 through which the pair of spots is projected are transmitted through the air interface to reach the light-receiving surface 1411. On the other hand, a light flux (a dotted line) directed to the opening portion 153 other than the two opening portions 153-1 and 153-2 is subjected to the total reflection condition on the air interface, thereby being returned to inside of the intra-layer/inter-layer light guide unit 120*a*. Laying out the markers 131 and the opening portions 153 in this manner keeps an unnecessary spot not contributive to the detection of an external force from being formed on the light-receiving surface 1411 of the light-receiving unit 141, and therefore can prevent incorrect detection of an external force.

Figure 9:
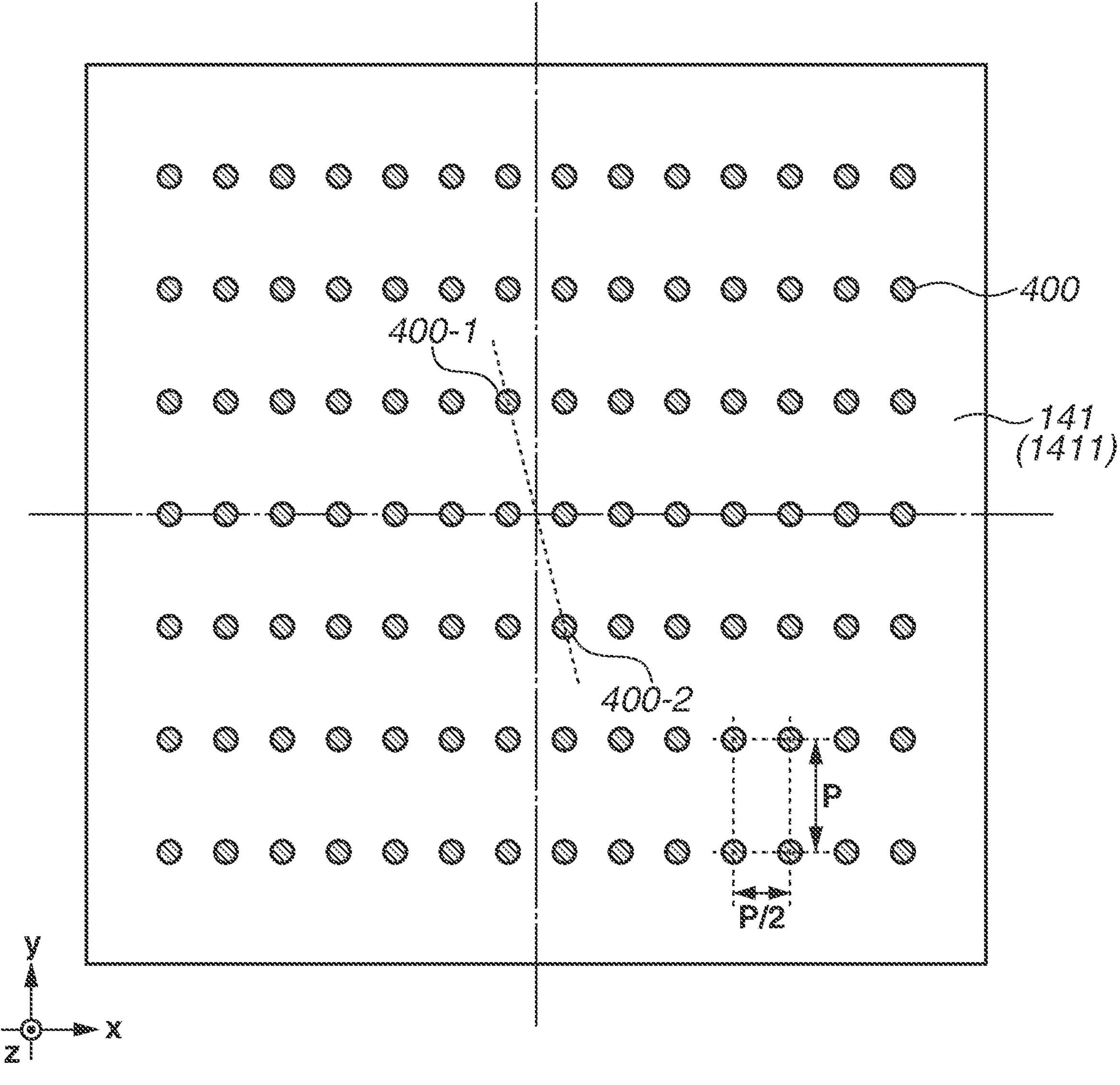
FIG. 9 illustrates a distribution of the spots projected on the light-receiving surface of the light-receiving unit due to the light from the markers that is transmitted through a plurality of opening portions in the optical tactile sensor according to the first embodiment of the present disclosure.

FIG. 9 illustrates a distribution of the spots 400 projected on the light-receiving surface 1411 of the light-receiving unit 141 due to the light from the markers 131 that is transmitted through the plurality of opening portions 153 in the optical tactile sensor 100-1 according to the first embodiment of the present disclosure. Components similar to the components illustrated in FIGS. 1, 3 to 5, and 8 are identified by the same reference numerals in FIG. 9, and the detailed descriptions thereof will be omitted. Further, FIG. 9 illustrates an xyz coordinate system corresponding to the xyz coordinate system illustrated in FIG. 1.

As illustrated in FIG. 9, the spots 400 projected on the light-receiving surface 1411 of the light-receiving unit 141 are laid out at vertical pitches (pitches in the y direction) of P and horizontal pitches (pitches in the x direction) of P/2. Further, in FIG. 9, the two spots 400 projected on the light-receiving surface 1411 of the light-receiving unit 141 due to the marker 131*c* located at the center of the xy plane of the light-translucent elastic member 130 illustrated in FIG. 6 will be referred to as the first spot 400-1 and the second spot 400-2.

Now, suppose that the perpendicular external force F is applied only to one point at the central position (the position of the marker 131*c* of the light-translucent elastic member 130 illustrated in FIG. 6) in the xy plane of the light-translucent elastic member 130 as an example.

Figure 10:
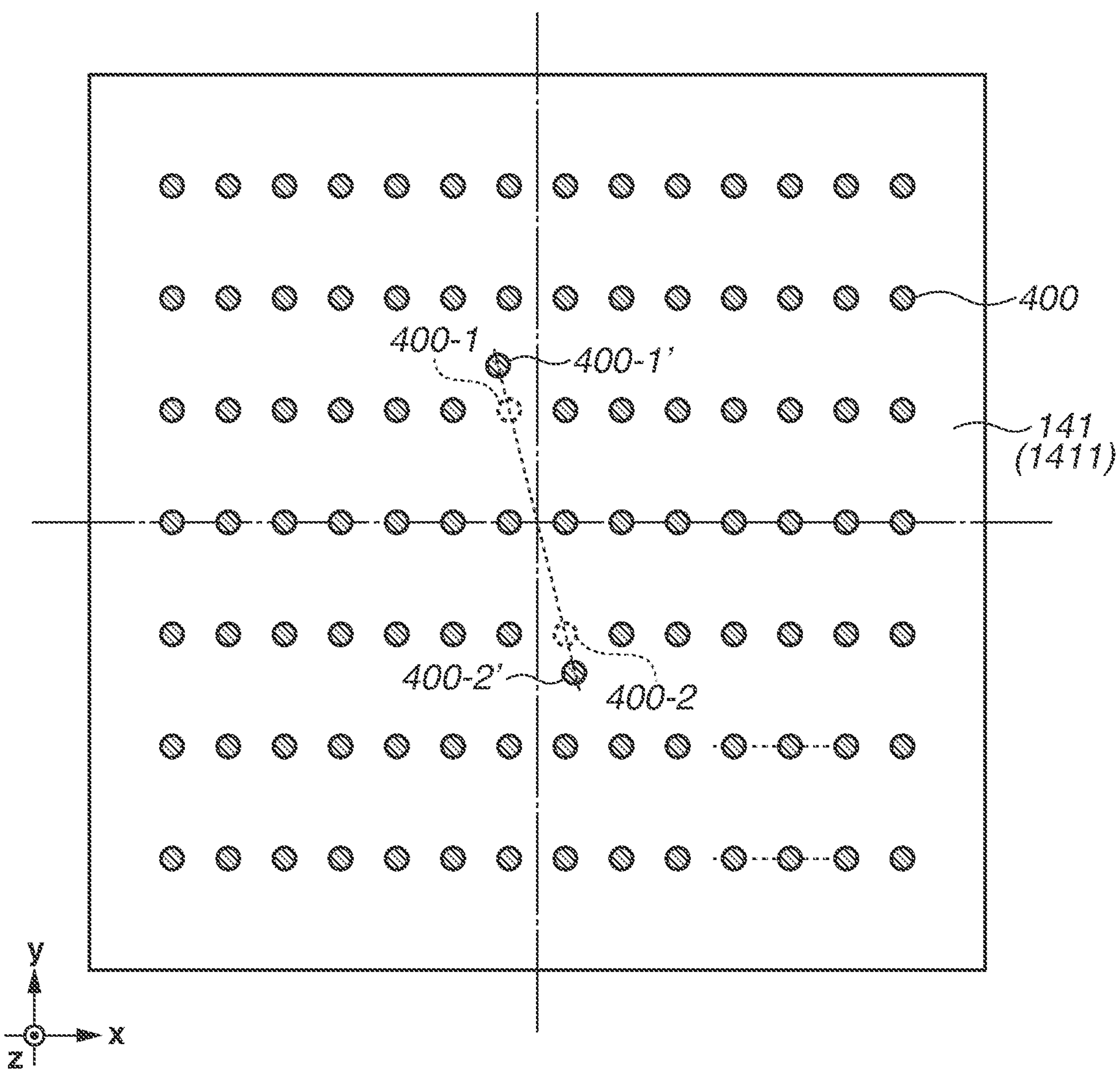
FIG. 10 illustrates a distribution of the spots projected on the light-receiving surface of the light-receiving unit due to the light from the markers that is transmitted through the plurality of opening portions in the optical tactile sensor according to the first embodiment of the present disclosure.

FIG. 10 illustrates a distribution of the spots 400 projected on the light-receiving surface 1411 of the light-receiving unit 141 due to the light from the markers 131 that is transmitted through the plurality of opening portions 153 in the optical tactile sensor 100-1 according to the first embodiment of the present disclosure. More specifically, FIG. 10 illustrates a distribution of the spots 400 projected on the light-receiving surface 1411 of the light-receiving unit 141 when the perpendicular external force F is applied to the central position (the position of the marker 131*c* of the light-translucent elastic member 130 illustrated in FIG. 6) in the xy plane of the light-translucent elastic member 130. Components similar to the components illustrated in FIG. 9 are identified by the same reference numerals in FIG. 10, and the detailed descriptions thereof will be omitted. Further, FIG. 10 illustrates an xyz coordinate system corresponding to the xyz coordinate system illustrated in FIG. 9.

When the perpendicular external force F is applied to the position of the marker 131*c* illustrated in FIG. 6, the first spot 400-1 and the second spot 400-2 are moved so as to be separated away from each other to be a first spot 400-1' and a second spot 400-2', respectively, as illustrated in FIG. 10. Then, the external force calculation unit 180 can determine that the perpendicular external force F is applied according to the separation amount between the first spot 400-1' and the second spot 400-2'.

Next, the operation of the external force calculation unit 180 will be described in detail.

With respect to the two spots 400 (the pair of spots) corresponding to each of the markers 131, the external force calculation unit 180 calculates the external forces applied in the perpendicular direction and the shearing direction in the following manner, thereby outputting an external force distribution. The external force calculation unit 180 can calculate the central position of each of the spots 400 (for example, the central position 411 and the central position 412 illustrated in FIGS. 4 and 5) by binarizing a light quantity distribution in a region containing the spot 400 based on a predetermined threshold value and calculating the central position as a centroid thereof. Alternatively, the external force calculation unit 180 may calculate the central position of each of the spots 400 (for example, the central position 411 and the central position 412 illustrated in FIGS. 4 and 5) as a weighted centroid based on the light quantity distribution in the region containing the spot 400. In the present example, the two spots 400 forming the pair of spots will be referred to as a spot A (for example, corresponding to the "first spot 400-1" illustrated in FIGS. 4 and 5) and a spot B (for example, corresponding to the "second spot 400-2" illustrated in FIGS. 4 and 5), respectively.

Assume that ΔAx and ΔAy represent change amounts of the x coordinate and the y coordinate of the central position of the spot A from a no-load state, respectively. Further, assume that ΔBx and ΔBy represent change amounts of the x coordinate and the y coordinate of the central position of the spot B from a no-load state, respectively. Then, the external force calculation unit 180 arithmetically calculates a perpendicular external force Fz using the following formula (2).

$$Fz = Kz \times \sqrt{(\Delta Ax - \Delta Bx)^2 + (\Delta Ay - \Delta By)^2} \tag{2}$$

In the above-described formula (2), Kz represents a predetermined sensitivity coefficient based on which the change in the distance between the spots in the pair (for example, the distance 420 illustrated in FIGS. 4 and 5) is converted into the external force. The sensitivity coefficient Kz may be set by use of a design value or may be set by use of an actually measured value of a known external force and calibrating it.

Further, the external force calculation unit 180 arithmetically calculates external forces Fx and Fy applied in the shearing direction using the following formulas (3) and (4), respectively.

$$Fx = -Kx \times \frac{(\Delta Ax + \Delta Bx)}{2} \tag{3}$$

$$Fy = -Ky \times \frac{(\Delta Ay + \Delta By)}{2} \tag{4}$$

In the above-described formulas (3) and (4), Kx and Ky represent predetermined sensitivity coefficients based on which the change in the central position of the pair of spots (for example, the central position 430 illustrated in FIGS. 4 and 5) is converted into the external forces applied in the x direction and the y direction, respectively. Each of the sensitivity coefficients Kx and Ky may be set by use of a design value or may be set by use of an actually measured value of a known external force and calibrating it.

In the optical tactile sensor 100-1 according to the first embodiment, the light-translucent elastic member 130 optically coupled via the one surface 122 of the intra-layer/inter-layer light guide unit 120*a* includes the markers 131 that diffuse the light incident via the one surface 122 of the intra-layer/inter-layer light guide unit 120*a* toward the one surface 122. Then, the plurality of opening portions 153, which is optically opened in such a manner that the light from the markers 131 is projected to be spaced apart from one another at the different positions on the light-receiving surface 1411 of the light-receiving unit 141, is provided between the other surface 123 of the intra-layer/inter-layer light guide unit 120*a* and the light-receiving unit 141.

With the configuration, the external force can be calculated by use of the distribution of the light projected to be spaced apart from one another at the different positions on the light-receiving surface 1411 of the light-receiving unit 141 via the plurality of opening portions 153.

As a result, a highly accurate tactile sensor is provided that is insusceptible to a change in the light emission quantity of the light incident from the light-emitting element 110, which is the light emission unit, or a change in the illumination characteristic of the light. While a reduction in thickness is unfeasible for a tactile sensor that images light emitted from the light emission unit on the light-receiving surface of the light-receiving unit using a lens due to the necessity of the thickness of the optical member and an optical path length for imaging, the reduction in thickness is feasible for the optical tactile sensor 100-1 according to the present embodiment due to its lensless configuration.

Next, a second embodiment of the present disclosure will be described. In the following description of the second embodiment, descriptions of features shared with the above-described first embodiment will be omitted and descriptions of features different from the above-described first embodiment will be provided.

Figure 11:
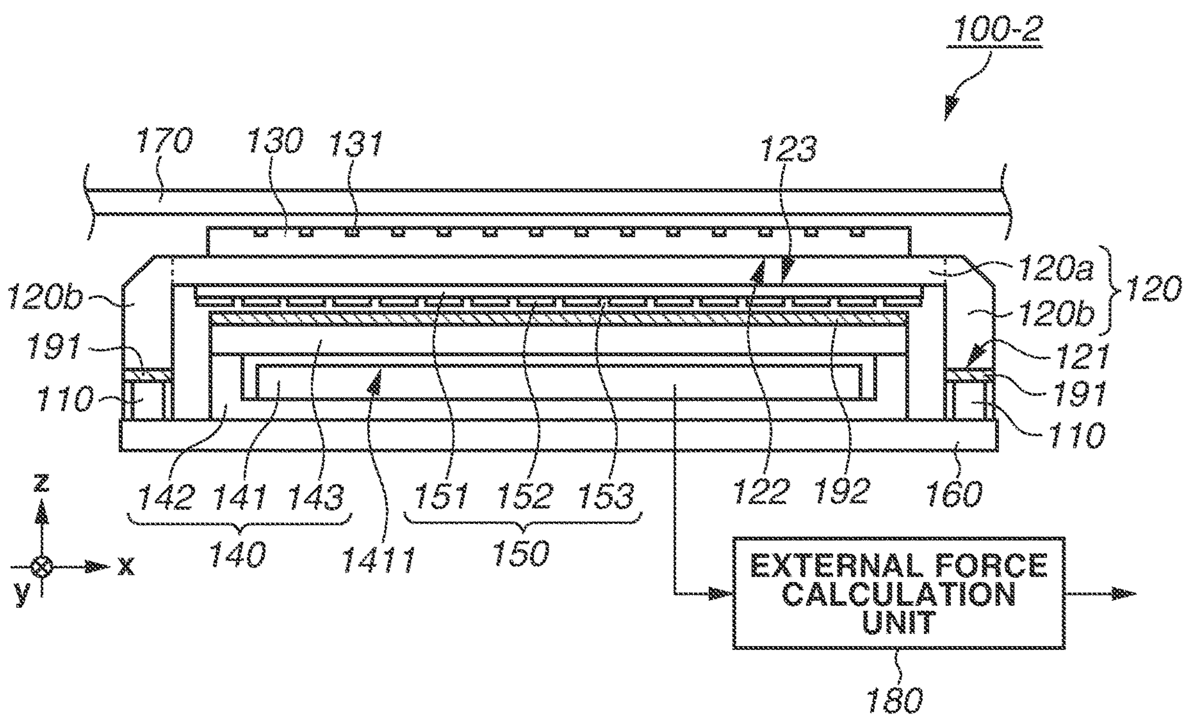
FIG. 11 illustrates an example of an outline of the configuration of an optical tactile sensor according to a second embodiment of the present disclosure.

FIG. 11 illustrates an example of an outline of the configuration of an optical tactile sensor 100-2 according to the second embodiment of the present disclosure. Components similar to the components illustrated in FIG. 1 are identified by the same reference numerals in FIG. 11, and the detailed descriptions thereof will be omitted. Further, FIG. 11 illustrates an xyz coordinate system corresponding to the xyz coordinate system illustrated in FIG. 1.

In the optical tactile sensor 100-2 according to the second embodiment illustrated in FIG. 11, a linear polarizing film 191 and a linear polarizing film 192 are added to the optical tactile sensor 100-1 according to the first embodiment illustrated in FIG. 1.

The linear polarizing film 191 is a linear polarizer provided between the light-emitting element 110 and the intra-layer/inter-layer light guide unit 120*a* (more specifically, the support light guide unit 120*b*), and configured to allow only polarized light in the x direction to pass therethrough.

The linear polarizing film 192 is a linear polarizer provided between the other surface 123 of the intra-layer/inter-layer light guide unit 120*a* and the light-receiving unit 141 (more specifically, provided on the surface (the upper surface) of the cover glass 143), and configured to allow only polarized light in the y direction to pass therethrough.

As a part of the guided light flux specularly reflected on the deformed surface is incident on the opening portion 153 at an angle smaller than the critical angle θc, the light flux transmitted through the opening portion 153 is attenuated by the linear polarizing film 192 formed on the surface (the upper surface) of the cover glass 143 when the deformed surface of the light-translucent elastic member 130 is deformed due to an external force. On the other hand, the diffused light from the markers 131 is almost unpolarized, and therefore is transmitted through the linear polarizing film 192 and detected by the light-receiving unit 141.

The optical tactile sensor 100-2 according to the second embodiment can prevent unnecessary stray light from being detected by the light-receiving unit 141 even when the light-translucent elastic member 130 is significantly deformed while providing the advantageous effects brought about by the first embodiment.

Next, a third embodiment of the present disclosure will be described. In the following description of the third embodiment, descriptions of features shared with the above-described first and second embodiments will be omitted and descriptions of features different from the above-described first and second embodiments will be provided.

Figure 12:
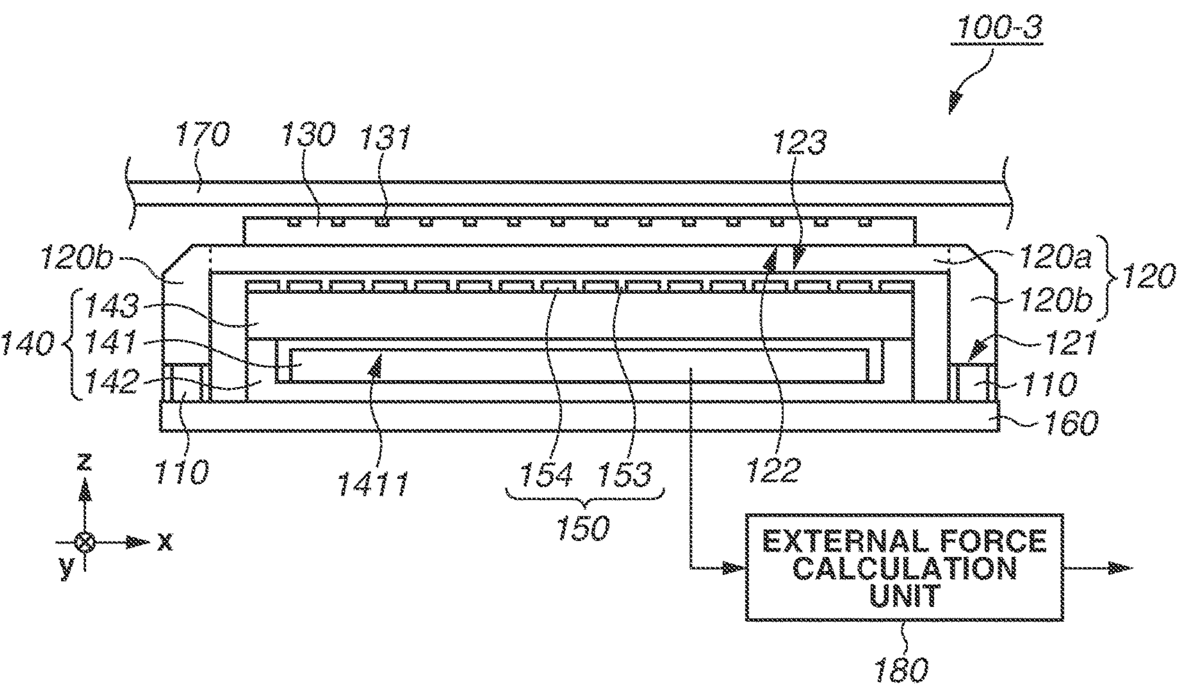
FIG. 12 illustrates an example of an outline of the configuration of an optical tactile sensor according to a third embodiment of the present disclosure.

FIG. 12 illustrates an example of an outline of the configuration of an optical tactile sensor 100-3 according to the third embodiment of the present disclosure. Components similar to the components illustrated in FIG. 1 are identified by the same reference numerals in FIG. 12, and the detailed descriptions thereof will be omitted. Further, FIG. 12 illustrates an xyz coordinate system corresponding to the xyz coordinate system illustrated in FIG. 1.

In the optical tactile sensor 100-3 according to the third embodiment illustrated in FIG. 12, a light-shielding film 150 is formed in a configuration different from that of the optical tactile sensor 100-1 according to the first embodiment illustrated in FIG. 1.

The light-shielding film 150 of the optical tactile sensor 100-3 according to the third embodiment is provided on the surface (the upper surface) of the cover glass 143 of the light-receiving sensor unit 140. More specifically, the light-shielding film 150 of the optical tactile sensor 100-3 includes the plurality of opening portions 153 that are extremely small formed on a light-shielding unit 154 made of, for example, a stainless substrate. The light-shielding film 150 of the optical tactile sensor 100-3 is not limited thereto, and, for example, can use a light-shielding unit 154 made of a chromic oxide film with the plurality of opening portions 153 patterned on a glass substrate. Further, the surface of the light-shielding film 150 of the optical tactile sensor 100-3 is coated with a low-reflection coating to prevent reflection. A light flux reaching a region other than the opening portions 153 is attenuated by the low-reflection light-shielding unit 154 on the light-shielding film 150 of the optical tactile sensor 100-3.

The optical tactile sensor 100-3 according to the third embodiment allows the intra-layer/inter-layer light guide unit 120*a* to serve as a waveguide utilizing total reflection, thereby improving light use efficiency, while providing the advantageous effects brought about by the first embodiment. Further, the optical tactile sensor 100-3 can reduce a light flux in the diffused light from the marker 131 that is not contributive to the formation of the spots 400 on the light-receiving surface 1411 of the light-receiving unit 141 with the aid of the low-reflection light-shielding unit 154, thereby improving the SN ratio on the light-receiving unit 141.

Next, a fourth embodiment of the present disclosure will be described. In the following description of the fourth embodiment, the descriptions of features shared with the above-described first to third embodiments will be omitted and descriptions of features different from the above-described first to third embodiments will be provided.

The optical tactile sensors (100-1)-(100-3) according to the above-described first to third embodiments are configured to employ the light-emitting element 110 including the light source such as an LED as the light emission unit that emits light to the intra-layer/inter-layer light guide unit 120*a*. The present disclosure is not limited to the above-described first to third embodiments. An optical tactile sensor 100-4 (not illustrated) according to the fourth embodiment employs, for example, an optical fiber 110*a* optically coupled with a light-emitting element provided outside the optical tactile sensor 100 instead of the light-emitting element 110 as the light emission unit that emits light to the intra-layer/inter-layer light guide unit 120*a*.

In the fourth embodiment, a highly accurate tactile sensor is provided that is insusceptible to a change in the light emission quantity of the light incident from the light emission unit (the optical fiber 110*a*), or a change in the illumination characteristic of the light, similarly to the above-described first embodiment.

Next, a fifth embodiment of the present disclosure will be described. In the following description of the fifth embodiment, descriptions of features shared with the above-described first to fourth embodiments will be omitted and descriptions of features different from the above-described first to fourth embodiments will be provided.

The fifth embodiment relates to a robot arm conveyance apparatus including the optical tactile sensor 100 according to any one of the above-described first to fourth embodiments.

Figure 13:
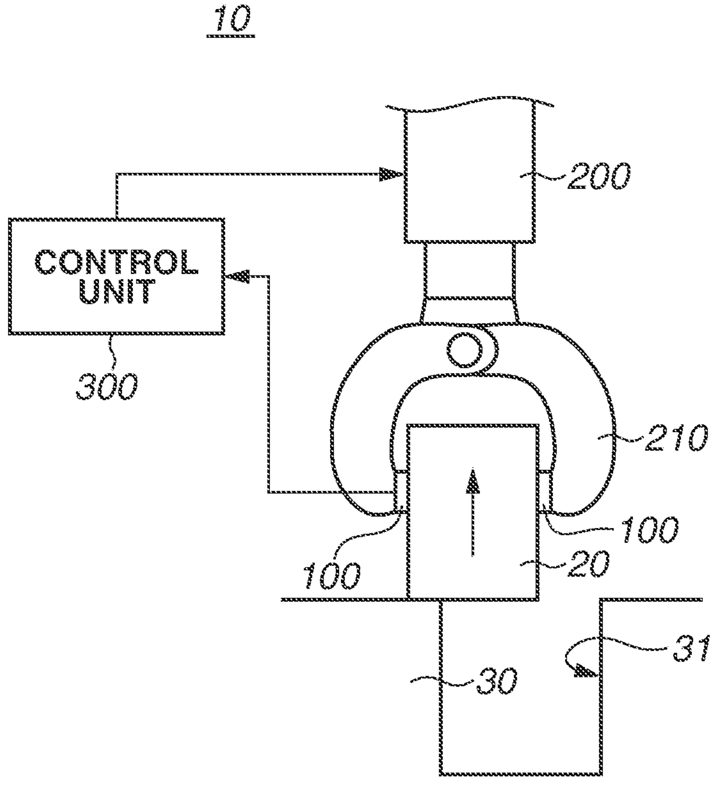
FIG. 13 illustrates an example of an outline of the configuration of a robot arm conveyance apparatus according to a fifth embodiment of the present disclosure.

FIG. 13 illustrates an example of an outline of the configuration of a robot arm conveyance apparatus 10 according to the fifth embodiment of the present disclosure. The robot arm conveyance apparatus 10 includes the optical tactile sensor 100 according to any one of the above-described first to fourth embodiments, a robot arm 200, and a control unit 300, as illustrated in FIG. 13.

The robot arm 200 is a movable unit operable on the robot arm conveyance apparatus 10, and the optical tactile sensor 100 according to any one of the above-described first to fourth embodiments is mounted at a distal end of a holding unit 210 as illustrated in FIG. 13. The robot arm 200 holds an object 20, which is a conveyance target, with the holding unit 210 with the optical tactile sensor 100 mounted at the distal end thereof. In the present embodiment, the robot arm 200 performs an operation of inserting the object 20 into a hole portion 31 formed on a substrate 30, and the operation is controlled by the control unit 300.

The optical tactile sensor 100 mounted at the distal end of the holding unit 210 of the robot arm 200 detects an external force received from the substrate 30 via the object 20. In the example illustrated in FIG. 13, if the object 20 is in contact with a portion other than the hole portion 31 on the upper surface of the substrate 30, an external force is applied to the optical tactile sensor 100, and therefore the optical tactile sensor 100 detects that the position of the object 20 is out of the position of the hole portion 31. Accordingly, the control unit 300 controls the operation of the robot arm 200 using the output from the optical tactile sensor 100 so as to move the object 20 along the upper surface of the substrate 30.

Then, when the object 20 is located above the hole portion 31 of the substrate the external force applied to the optical tactile sensor 100 until this time is removed, and therefore the optical tactile sensor 100 detects that the position of the object 20 coincides with the position of the hole portion 31 of the substrate 30. Accordingly, the control unit 300 controls the operation of the robot arm 200 using the output from the optical tactile sensor 100 so as to insert the object 20 into the hole portion 31.

In this manner, the robot arm conveyance apparatus 10 includes the robot arm 200 (more specifically, the holding unit 210), which is the movable unit, the optical tactile sensor 100, and the control unit 300, which controls the operation of the robot arm 200 using the output of the optical tactile sensor 100. The fifth embodiment is not limited to the robot arm conveyance apparatus 10 illustrated in FIG. 13. For example, various kinds of apparatuses different from the robot arm conveyance apparatus 10 and configured to control an operation of a movable unit using the output of the optical tactile sensor 100 are also employable as the fifth embodiment.

According to the fifth embodiment, highly accurate control of the movable unit and a highly sensitive man-machine interface can be implemented.

The disclosure of the embodiments of the present disclosure includes the following configurations.

Configuration 1

A tactile sensor comprises:

a light emission unit configured to emit light;

a light guide unit provided to extend in a predetermined direction to guide light incident from the light emission unit via an optical end optically coupled with the light emission unit in the predetermined direction, the light guide unit including a pair of surfaces opposite to each other in the predetermined direction;

an optical translucent elastic member optically coupled with the light guide unit via one surface of the pair of surfaces and including a marker configured to diffuse light incident via the one surface toward the one surface;

a light-receiving unit provided on a side closer to the other surface of the pair of surfaces and including a plurality of light-receiving elements on a light-receiving surface; and a plurality of opening portions provided between the other surface and the light-receiving unit and optically opened in such a manner that the light from the marker is projected to be spaced apart from one another at different positions on the light-receiving surface of the light-receiving unit.

Configuration 2

In the tactile sensor according to configuration 1, the light emission unit is a light source.

Configuration 3

In the tactile sensor according to configuration 1, the light emission unit is an optical fiber optically coupled with a light source.

Configuration 4

In the tactile sensor according to any one of configurations 1 to 3, the plurality of opening portions has higher transmittance than a region between the plurality of opening portions.

Configuration 5

The tactile sensor according to any one of configurations 1 to 4, further comprises a linear polarizer between the other surface and the light-receiving unit.

Configuration 6

In the tactile sensor according to any one of configurations 1 to 5, the light-receiving unit outputs first information regarding a distribution of the light received on the light-receiving surface.

Configuration 7

In the tactile sensor according to configuration 6, the light-receiving unit outputs the first information to a calculation unit, the calculation unit being configured to calculate second information regarding an external force received by the optical translucent elastic member based on the first information.

Configuration 8

The tactile sensor according to configuration 7, further comprises the calculation unit.

Configuration 9

An apparatus comprises:

an operable movable unit;

the tactile sensor according to any one of configurations 1 to 8; and a control unit configured to control an operation of the movable unit using an output of the tactile sensor.

Any of the above-described embodiments of the present disclosure merely indicates an example of embodiment in implementing the present disclosure, and the technical scope of the present disclosure shall not be construed limitedly by them. In other words, the present disclosure can be implemented in various manners without departing from the technical idea thereof or the main features thereof.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-104762, filed Jun. 29, 2022, which is hereby incorporated by reference herein in its entirety.

What is claimed is:

1. A tactile sensor comprising:

a light emission unit configured to emit light;

a light guide unit, extending in a predetermined direction, provided to guide light, incident from the light emission unit via an optical end optically coupled with the light emission unit, in the predetermined direction, the light guide unit including a pair of surfaces, opposite to each other, extending in the predetermined direction;

an optical translucent elastic member optically coupled with the light guide unit via one surface of the pair of surfaces and including at least one marker configured to diffuse light, incident via the one surface, toward the light guide unit;

a light-receiving unit provided on a side of the light guide unit closer to the other surface of the pair of surfaces than to the one surface, and including a plurality of light-receiving elements on a light-receiving surface; and a plurality of opening portions provided between the other surface and the light-receiving unit, and optically opened such that light from the at least one marker is projected to different positions, spaced apart from one another, on the light-receiving surface of the light-receiving unit, wherein the light-receiving unit is configured to receive at least two signals from the at least one marker, wherein the light-receiving unit outputs first information regarding a distribution of the light including the two signals received on the light-receiving surface, and wherein the light-receiving unit outputs the first information to a calculation unit, the calculation unit being configured to calculate second information regarding an external force received by the optical translucent elastic member based on the first information.

2. The tactile sensor according to claim 1, wherein the light emission unit is a light source.

3. The tactile sensor according to claim 1, wherein the light emission unit is an optical fiber optically coupled with a light source.

4. The tactile sensor according to claim 1, wherein the plurality of opening portions has higher transmittance than a region between the plurality of opening portions.

5. The tactile sensor according to claim 1, further comprising a linear polarizer between the other surface and the light-receiving unit.

6. The tactile sensor according to claim 1, further comprising the calculation unit.

7. An apparatus comprising:

an operable movable unit;

the tactile sensor according to claim 1; and a control unit configured to control an operation of the movable unit using an output of the tactile sensor.

* * * * *